(12) United States Patent
Yoo

(10) Patent No.: US 8,726,362 B2
(45) Date of Patent: May 13, 2014

(54) SOC-BASED DEVICE FOR PACKET FILTERING AND PACKET FILTERING METHOD THEREOF

(75) Inventor: InSeon Yoo, Osan-si (KR)

(73) Assignee: Samsung SDS Co., Ltd., Seoul (KR)

( * ) Notice: Subject to any disclaimer, the term of this patent is extended or adjusted under 35 U.S.C. 154(b) by 1 day.

(21) Appl. No.: 13/422,672

(22) Filed: Mar. 16, 2012

(65) Prior Publication Data

US 2012/0240215 A1    Sep. 20, 2012

Related U.S. Application Data

(60) Provisional application No. 61/453,290, filed on Mar. 16, 2011.

(51) Int. Cl.
*H04L 29/06* (2006.01)

(52) U.S. Cl.
USPC .............................................. 726/13; 726/22

(58) Field of Classification Search
USPC ..................... 726/13, 11, 22, 1; 713/153, 154
See application file for complete search history.

(56) References Cited

U.S. PATENT DOCUMENTS

| | | | |
|---|---|---|---|
| 6,205,552 B1 | 3/2001 | Fudge | |
| 6,868,450 B1 * | 3/2005 | Lucovsky | 709/229 |
| 7,254,562 B2 | 8/2007 | Hsu et al. | |
| 7,316,029 B1 | 1/2008 | Parker et al. | |
| 7,418,253 B2 | 8/2008 | Kavanagh | |
| 7,490,350 B1 | 2/2009 | Murotake et al. | |
| 7,523,500 B1 | 4/2009 | Szor et al. | |
| 7,839,854 B2 | 11/2010 | Alexander | |
| 7,840,763 B2 | 11/2010 | Murotake et al. | |
| 8,079,084 B1 | 12/2011 | Huang et al. | |
| 2004/0039939 A1 | 2/2004 | Cox et al. | |
| 2004/0059943 A1 | 3/2004 | Marquet et al. | |
| 2004/0143751 A1 | 7/2004 | Peikari | |
| 2005/0080888 A1 | 4/2005 | Walter | |
| 2005/0216770 A1 | 9/2005 | Rowett et al. | |
| 2006/0265486 A1 | 11/2006 | Killian et al. | |
| 2007/0011734 A1 | 1/2007 | Balakrishnan et al. | |
| 2007/0022479 A1 | 1/2007 | Sikdar et al. | |
| 2008/0163356 A1 | 7/2008 | Won-Jip et al. | |
| 2008/0282339 A1 * | 11/2008 | Nakae et al. | 726/13 |

(Continued)

FOREIGN PATENT DOCUMENTS

| | | |
|---|---|---|
| EP | 1392035 A2 | 2/2004 |
| JP | 2006-157313 A | 6/2006 |

(Continued)

OTHER PUBLICATIONS

Extended European Search Report, dated Jul. 26, 2012, issued by the European Patent Office in counterpart European Application No. 12159676.1.

(Continued)

*Primary Examiner* — Edward Zee
(74) *Attorney, Agent, or Firm* — Sughrue Mion, PLLC

(57) ABSTRACT

Provided is a device including a chip that includes a firewall engine, and a driver, wherein the driver identifies an owner process of a packet to be transmitted, and transmits the packet to the chip only if the owner process is allowed to transmit the packet to an external device, wherein the chip performs filtering by applying a rule for packet filtering to the packet received from the driver.

22 Claims, 14 Drawing Sheets

(56) References Cited

U.S. PATENT DOCUMENTS

| | | | |
|---|---|---|---|
| 2009/0016226 | A1 | 1/2009 | LaVigne et al. |
| 2009/0150996 | A1 | 6/2009 | Haswell |
| 2009/0240874 | A1* | 9/2009 | Pong .......................... 711/105 |
| 2009/0249465 | A1 | 10/2009 | Touboul |
| 2009/0282486 | A1 | 11/2009 | Zimmer et al. |
| 2009/0293126 | A1 | 11/2009 | Archer et al. |
| 2010/0088742 | A1 | 4/2010 | Wiryaman et al. |
| 2010/0107215 | A1 | 4/2010 | Bechtel et al. |
| 2010/0138909 | A1 | 6/2010 | Chen |
| 2010/0281539 | A1 | 11/2010 | Burns et al. |

FOREIGN PATENT DOCUMENTS

| | | | |
|---|---|---|---|
| JP | 2006-186877 | A | 7/2006 |
| JP | 2006331422 | A | 12/2006 |
| JP | 2007-329876 | A | 12/2007 |
| JP | 200937598 | A | 2/2009 |
| KR | 1020010105116 | A | 11/2001 |
| KR | 20030030044 | A | 4/2003 |
| KR | 1020040090373 | A | 10/2004 |
| KR | 100468374 | B1 | 1/2005 |
| KR | 100750377 | B1 | 8/2007 |
| KR | 1020080056548 | A | 6/2008 |
| KR | 1020080074271 | A | 8/2008 |
| KR | 1020080113087 | A | 12/2008 |

OTHER PUBLICATIONS

Song, Haoyu, et al., "Snort Offloader: A Reconfigurable Hardware NIDS Filter," International Conference on Field Programmable Logic and Applications, Aug. 2005, pp. 493-498.

Yang, Yang et al., "A Software Implementation for a hybrid Firewall Using Linux Netfilter," 2010 Second WRI World Congress on Software Engineering, Dec. 2010, pp. 18-21.

Accardi, Kristen et al., "Network Processor Acceleration for a Linux Netfilter Firewall," Symposium on Architecture for Networking and Communications Systems, Oct. 2005, pp. 115-123.

Andreasson, "Iptables Tutorial 1.2.2," The Netfilter webmaster, Aug. 2008, Ch.10, pp. 112-153.

Communication dated Jun. 12, 2012 issued by the European Patent Office in counterpart European Patent Application No. 12159780.1.

Lee, et al., "Compiling Policy Descriptions into Reconfigurable Firewall Processors", Field-Programming Custom Computing Machines, Apr. 9, 2003, 10 pgs total.

Mitra, et al., "Compiling PCRE to FPGA for Accelerating SNORT IDS", Proceedings of the 3d ACM/IEEE Symposium on Architecture for Networking and Communications Systems, Jan. 1, 2007, 9 pgs, total.

Payne, et al., "Architecture and Applications for a Distributed Embedded Firewall", Computer Security Applications Conference, Dec. 10, 2001, 8 pgs total.

Hazelhurst, et al., "Algorithms for Improving the Dependability of Firewall and Filter Rule Lists", Dependable Systems and Networks, Jun. 25, 2000, 10 pgs total.

Kayssi, et al., "FPGA-Based Internet Protocol Firewall Chip", Electronics, Circuits and Sytems, Dec. 17, 2000, vol. 17, 4 pgs total.

Communication dated Jul. 24, 2012 issued by the Korean Intellectual Property Office in counterpart Korean Patent Application No. 10-2011-0054160.

Chen, et al., "AntiWorm NPU-based Parallel Bloom Filters for TCP/IP Content Processing in Giga-Ethernet LAN", Local Computers Network, 2005, pp. 1-8.

Communication dated Apr. 2, 2012 issued by the U.S. Patent Office in counterpart U.S. Appl. No. 13/164,770.

Communication dated May 23, 2012 issued by the U.S. Patent Office in counterpart U.S. Appl. No. 13/164,770.

Communication dated Oct. 3, 2012 issued by the U.S. Patent Office in counterpart U.S. Appl. No. 13/164,770.

Communication dated Jan. 30, 2012 issued by the European Patent Office in counterpart European Patent Application No. 11170363.3.

Lockwood, et al., "An Extensible, System-On-Programmable-Chip, Content-Aware Internet Firewall", Jan. 2003, vol. 2778, 10 pgs total.

Raouf Ajami, "Embedded Network Firewall on FPGA", Nov. 2010, 99 pgs total.

Communication dated Nov. 17, 2010 issued in International Patent Application No. PCT/KR2010/001851.

Communication, dated May 27, 2013, issued by the Korean Intellectual Property Office in counterpart Korean Application No. 10-2012-0027053.

Communication, dated May 17, 2013, issued by the Japanese Patent Office in counterpart Japanese Application No. 2012-060195.

Communication dated Sep. 10, 2013 issued by the Japanese Patent Office in counterpart Japanese Patent Application No. 2012-060195.

Communication, dated Jul. 19, 2013, issued by the Japanese Patent Office in counterpart Japanese Patent Application No. 2012-059744.

* cited by examiner

| Basic Setting | Basic Rule Setting | Setting for Each Process |

511

Configuration Helper　　[        ▽]～512

Rule Name　　[        ]

IP　　[        ]

Protocol　　[    ▽]

Port　　[    ▽] ~ [        ]

Direction　　[    ▽]

Local Device　　[    ▽]

Mac Address　　[        ]

Action　　[    ▽]

[Add]　　[Cancel]

US 8,726,362 B2

SOC-BASED DEVICE FOR PACKET FILTERING AND PACKET FILTERING METHOD THEREOF

CROSS-REFERENCE TO RELATED PATENT APPLICATION

This application claims benefit from U.S. Provisional Patent Application No. 61/453,290, filed on Mar. 16, 2011 in the United States Patent and Trademark Office, the disclosure of which is incorporated herein by reference in its entirety.

BACKGROUND

1. Field

Apparatuses and methods consistent with the exemplary embodiments relate a system-on-chip (SOC)-based device which can provide packet filtering and a packet filtering method thereof, and more particularly, to a SOC-based device which can provide packet filtering by setting a firewall to allow or block packets according to a process of a network application, and a packet filtering method thereof.

2. Description of the Related Art

As the internet is being widely used, malicious malware of various forms such as worm, Trojan horses, viruses, or DDoS appears and damage by the malware is increasing. Therefore, there is a demand for a method for responding to network attacks to protect information over a network and a relevant device.

In particular, mobile devices have limited available resources and thus require high speed filtering technology to filter packets at a high speed, while using resources at the minimum.

SUMMARY

One or more aspects of the exemplary embodiments provide a device which sets a firewall to allow or block packets according to a process of a network application, thereby allowing or blocking all of the packets generated by the process, and a packet filtering method thereof.

One or more aspects of the exemplary embodiments provide a device which can more easily perform a firewall setting job with respect to a service desired by a user by providing a configuration helper when setting a rule for packet filtering, and a packet filtering method thereof.

According to an aspect of an exemplary embodiment, there is provided a device including a chip that includes a firewall engine, and a driver, wherein the driver identifies an owner process of a packet to be transmitted, and transmits the packet to the chip only if the owner process is allowed to transmit the packet to an external device, wherein the chip performs filtering by applying a rule for packet filtering to the packet received from the driver.

According to an aspect of another exemplary embodiment, there is provided a packet filtering method of a device on which a SOC is mounted and which includes network processes, the packet filtering method including: identifying, by the device, an owner process of a packet to be transmitted, and transmitting the packet to the SOC only if the owner process of the packet to be transmitted is allowed to transmit the packet to an external device, and filtering, by the SOC, the packet transmitted from the device by applying a rule for packet filtering.

According to an aspect of still another exemplary embodiment, there is provided a non-transitory computer readable storing medium that stores a program for enabling a computer to perform a method, the method including: identifying an owner process of a packet to be transmitted to an external device, and, only if the owner process of the packet to be transmitted is allowed to transmit the packet to the external device, transmitting the packet to a chip that is mounted on the computer and has a packet filtering function.

According to an aspect of still another exemplary embodiment, there is provided a device including a chip that includes a firewall engine, and a driver, wherein the driver obtains an owner process ID of a packet to be transmitted to an external device and transmits the packet and the owner process ID of the packet to the chip, wherein the firewall engine of the chip filters the packet transmitted from the driver using a rule DB for packet filtering.

According to an aspect of still another exemplary embodiment, there is provided a non-transitory computer readable storing medium that stores a program for enabling a computer to perform a method, the method including: identifying an owner process of a packet to be transmitted to an external device, obtaining an owner process ID of the packet to be transmitted to the external device, and transmitting the packet to be transmitted to the external device and the owner process ID of the packet to a chip that is mounted on the computer and has a packet filtering function.

Additional aspects and advantages of the exemplary embodiments will be set forth in the detailed description, will be obvious from the detailed description, or may be learned by practicing the exemplary embodiments.

BRIEF DESCRIPTION OF THE DRAWINGS

The above and other features and advantages will become more apparent by describing in detail exemplary embodiments with reference to the attached drawings in which:

FIG. 5 is a view to explain a rule setting screen provided by a firewall user interface according to an exemplary embodiment;

DETAILED DESCRIPTION OF EXEMPLARY EMBODIMENTS

Exemplary embodiments will now be described more fully with reference to the accompanying drawings to clarify aspects, features and advantages of the inventive concept. The exemplary embodiments may, however, be embodied in many different forms and should not be construed as limited to the exemplary embodiments set forth herein. Rather, the exemplary embodiments are provided so that this disclosure will be thorough and complete, and will fully convey the scope of the application to those of ordinary skill in the art. It will be understood that when an element, layer or region is referred to as being "on" another element, layer or region, the element, layer or region can be directly on another element, layer or region or intervening elements, layers or regions.

The terms used herein are for the purpose of describing particular exemplary embodiments only and are not intended to be limiting. As used herein, the singular forms "a", "an" and "the" are intended to include the plural forms as well, unless the context clearly indicates otherwise. It will be further understood that the terms "comprises" and/or "comprising," when used in this specification, do not preclude the presence or addition of one or more other components.

Hereinafter, exemplary embodiments will be described in greater detail with reference to the accompanying drawings. The matters defined in the description, such as detailed construction and elements, are provided to assist in a comprehensive understanding of the exemplary embodiments. However, it is apparent that the exemplary embodiments can be carried out by those of ordinary skill in the art without those specifically defined matters. In the description of the exemplary embodiment, certain detailed explanations of related art are omitted when it is deemed that they may unnecessarily obscure the essence of the inventive concept.

Figure 1:
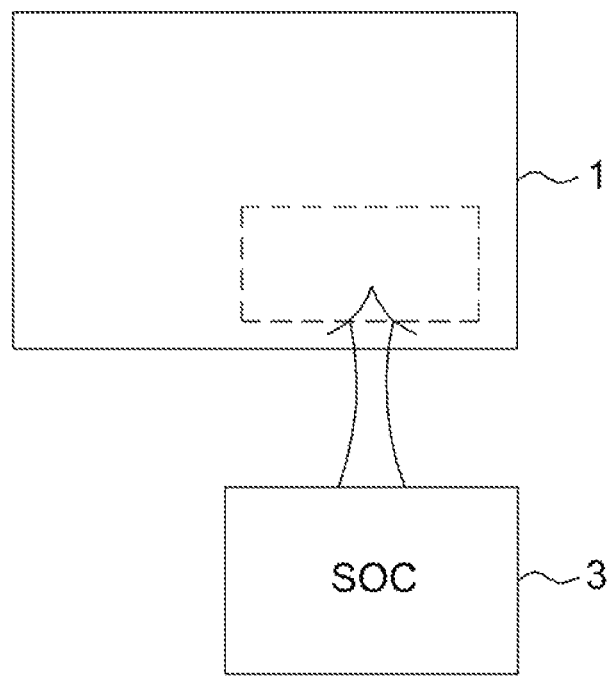
FIG. 1 is a view to explain a device on which a SOC is mounted according to an exemplary embodiment.

FIG. 1 is a view to explain a device on which a SOC is mounted according to an exemplary embodiment.

Referring to FIG. 1, a device 1 according to an exemplary embodiment includes a SOC 3 mounted thereon and having a firewall function to filter packets.

The device 1 may include at least one application that uses a packet transmitted/received through a network, and each application may include at least one process. For convenience of explanation, a process that uses a certain packet by transmitting the packet to an external device or receiving the packet from the external device is referred to as an "owner process" of the packet. According to an exemplary embodiment, each of the processes is assigned an identification (ID) so that the processes can be distinguished from one another. Each packet includes a process ID of an owner process using the packet. Accordingly, the owner process using the packet may be identified by the process ID included in the packet.

According to an exemplary embodiment, the SOC 3 may include a network interface card (NIC) and accordingly the device 1 may transmit the packet to the external device through the SOC 3 and may receive the packet from the external device through the SOC 3.

The SOC 3 may include a storage unit that stores a rule, which is a criterion based on which a packet is determined to be allowed or blocked, and a firewall engine that allows the packet to be transmitted/received or blocks the packet by applying the rule. If the SOC 3 receives a packet from the device 1 in this configuration, the SOC 3 transmits the packet to an external device or blocks the packet by applying a rule database (DB) stored in the SOC. Also, if the SOC 3 receives a packet from an external device, the SOC may transmit the packet to the device 1 or block the packet by applying the rule DB.

The device 1 may perform the following operations when transmitting a packet to an external device.

If the SOC 3 includes the NIC and the device 1 transmits/receives the packet with the external device through the NIC, the device 1 identifies the owner process of the packet to be transmitted and transmits the packet to the SOC 3 only if the owner process of the packet to be transmitted is allowed to transmit the packet to the external device.

The SOC 3 stores a pre-defined rule in the rule DB and allows the packet to be transmitted to the external device or blocks the packet by applying the rule. To achieve this, the SOC 3 may include a firewall engine that is configured in a hardware and/or software level.

The device 1 may include a rule DB for each process that defines a packet as being allowed or blocked according to a process. Also, the device 1 obtains the process ID of the owner process included in the packet to be transmitted to the external device, and determines whether the owner process is allowed to transmit the packet to the external device or not by referring to the rule DB for each process. Only if the owner process is allowed to transmit the packet, the device 1 transmits the packet to the SOC 3.

Also, if the owner process of the packet to be transmitted is not allowed to transmit the packet to the external device as a result of applying the rule for each process to the packet, the device 1 does not transmit the packet to the SOC 3.

Additionally, if the owner process of the packet to be transmitted to the external device is not allowed to transmit the packet to the external device, the device 1 may stop executing the owner process of the packet.

The device 1 may perform the following operations when receiving a packet from an external device.

If the SOC 3 includes the NIC and receives a packet from an external device through the NIC, the SOC 3 determines whether to allow or block the packet received from the external device by applying the rule DB of the SOC 3.

The SOC 3 transmits the packet to the device 1 only if the packet is allowed to pass as a result of applying the rule.

According to an exemplary embodiment, the device 1 includes a rule DB for each process that defines a packet as being allowed or blocked according to a process. Accordingly, the device 1 may apply the rule for each process to the packet received from the SOC 3 prior to transmitting the packet to the owner process.

If the owner process of the packet received from the SOC 3 is prohibited from receiving as a result of applying the rule for each process, the device 1 does not transmit the packet to the owner process and discards the packet. According to an exemplary embodiment, the device 1 may stop executing the owner process of the discarded packet.

The device 1 may provide a rule setting screen to receive a setting of a rule from the user. The rule setting screen may include an area to receive information of at least one of an IP, a protocol, and a port from the user. The rule setting screen will be described later.

The device 1 transmits the rule input by the user through the rule setting screen to the SOC 3, and the SOC 3 may reflect the rule transmitted from the device 1 into the rule DB stored in the storage unit of the SOC 3

Among the rules input by the user, the device 1 may not transmit the rule for each process to the SOC 3 and may store the rule for each process in a storage unit (not shown) of the device 1. After that, the device 1 may allow or block the packet according to a process using the rule for each process stored in the storage unit (not shown) of the device 1.

Although not shown in FIG. 1, the SOC 3 may include hardware and/or software resources including a central processing unit (CPU), a memory, a memory controller, and a rule DB storage unit. Although the resources necessary for driving programs such as a CPU, a memory, a memory controller, and a rule DB storage unit are not explicitly explained in this specification, it should be understood that the hardware and software resources necessary for driving the programs and operations thereof are included. For example, the firewall engine included in the SOC 3 may include a matcher to match the rule DB and the packet and a firmware to operate the matcher. However, although the matcher and the firmware are not explicitly mentioned, it should be understood that a storage unit to store the firmware and a CPU to load the firmware into a memory are included in the SOC 3.

Similarly, if the device 1 is described as including a certain application or driver, it should be understood that hardware and/or software resources to operate the application or driver are included.

The device 1 may be a mobile device such as a smart phone or a personal digital assistant (PDA). However, this is merely an example and the device 1 may be a fixed-type device such as a desktop computer.

Figure 2:
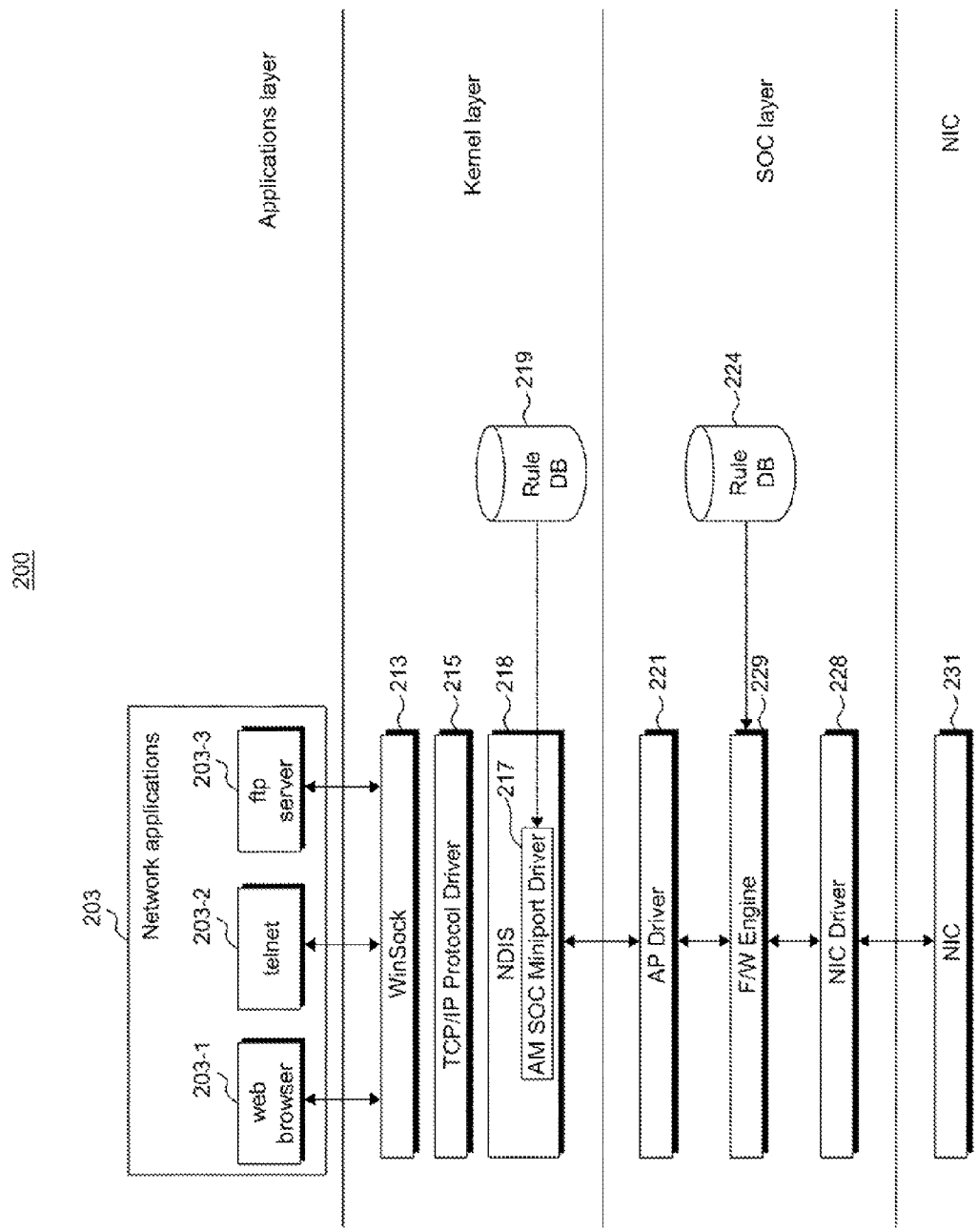
FIG. 2 is a view to explain a device on which a SOC is mounted according to an exemplary embodiment.

FIG. 2 is a view to explain a device on which a SOC is mounted according to an exemplary embodiment. In the exemplary embodiment of FIG. 2, a firewall is realized based on the SOC and is mounted on the device 200.

As shown in FIG. 2, the device 200 may be divided into an application layer, a kernel layer, a SOC layer, and a NIC layer. Some of these function layers may be omitted or another function layer may be added according to an exemplary embodiment. Also, a detailed element of each function layer may be modified. Therefore, the configuration of FIG. 2 is merely an example and the present disclosure should not be limited to FIG. 2. Hereinafter, the present disclosure is explained based on the embodiment of FIG. 2.

Referring to FIG. 2, the application layer may include an application 203. The application layer is the uppermost function layer of the device 200 and includes the application 203 that uses packet data to be packet-filtered. For example, the application 203 may be at least one of a web browser 203-1, a telnet 203-2, and an FTP server 203-3, and may be one of applications that use predetermined packet data.

In the exemplary embodiment of FIG. 2, the kernel layer of the device 200 may transmit information within the packet data received by the device 200 from an external device to the application layer, or may generate packet data according to a request by the application layer and transmit the packet data to an external device.

If a transmission control protocol/internet protocol (TCP/IP) is used to transmit/receive packet data as shown in FIG. 2, the device 200 includes a TCP/IP driver 215. Also, if the device 200 uses Windows as an operating system (OS), the device 200 includes a WinSock 213. Since the operations of the TCP/IP driver 215 and the WinSock 213 are well known, a detailed description thereof is omitted.

If the device 200 uses a different protocol other than the TCP/IP, the device 200 may include a driver for using the different protocol, and, if the device 200 uses a different operating system other than the Windows operating system, the device 200 may include an element other than the WinSock 213.

The kernel layer may further include a network driver interface specification (NDIS) 218, and the NDIS 218 may include an anti-malware SOC miniport driver 217 (hereinafter, referred to as a 'miniport driver').

The miniport driver 217 may receive the packet data from the application 203 and transmit the packet data to an AP driver 221, or may receive packet data from the AP driver 221 and transmit the packet data to an upper layer.

According to an exemplary embodiment, the miniport driver 217 may filter the packet data according to a process prior to transmitting the packet data to the AP driver 221. If a rule set according to a process is included among the rules set by the user, the rule is stored in an area managed by the kernel layer. In this exemplary embodiment, the rule for each process may be stored in a rule DB 219. The rule DB 219 may store only the rule for each process and may further store a rule used for filtering the packet. If the packet data is received from the application 203, the miniport driver 217 identifies an owner process and determines whether to allow the packet or not by referring to the rule for each process. This operation will be described in detail with reference to FIG. 3.

The SOC mounted on the device 200 of FIG. 2 includes the AP driver 221, a firewall engine 229, an NIC driver 228, and an NIC 231.

The AP driver 221 receives data from the miniport driver 217 and transmits the data to the firewall engine 229. The firewall engine 229 goes through a packet verification process and performs packet filtering. The packet verification process is to prevent an attack such as Syn Flooding.

The firewall engine 229 determines whether to allow or block the packet data by applying a filtering rule to the packet data, and performs filtering, that is, allows or blocks the packet data according to a result of the determining. The SOC includes a rule DB 224 and the firewall engine 229 performs packet filtering using a rule stored in the rule DB 224.

If a packet is to be transmitted to the outside of the device 200, the firewall engine 229 transmits only the packet that is determined to be 'allowed' as a result of the packet filtering to the NIC driver 228. The NIC driver 228 transmits the packet received from the firewall engine 229 to the NIC 231. After that, the NIC 213 transmits the packet to an external network.

If the device 200 receives a packet from an external device, the firewall engine 229 transmits only the packet that is determined to be 'allowed' as a result of the packet filtering to the AP driver 221, and the AP driver 221 transmits the packet to the miniport driver 217.

The NIC 231 may transmit the packet data to a packet data network or receive the packet data from the packet data network, and may be mounted in the SOC as a part. The NIC 231 may receive the packet data through a wired or wireless LAN, for example.

A packet filtering operation of the above configuration according to an exemplary embodiment will be explained with reference to FIGS. 3A and 3B.

Figure 3A:
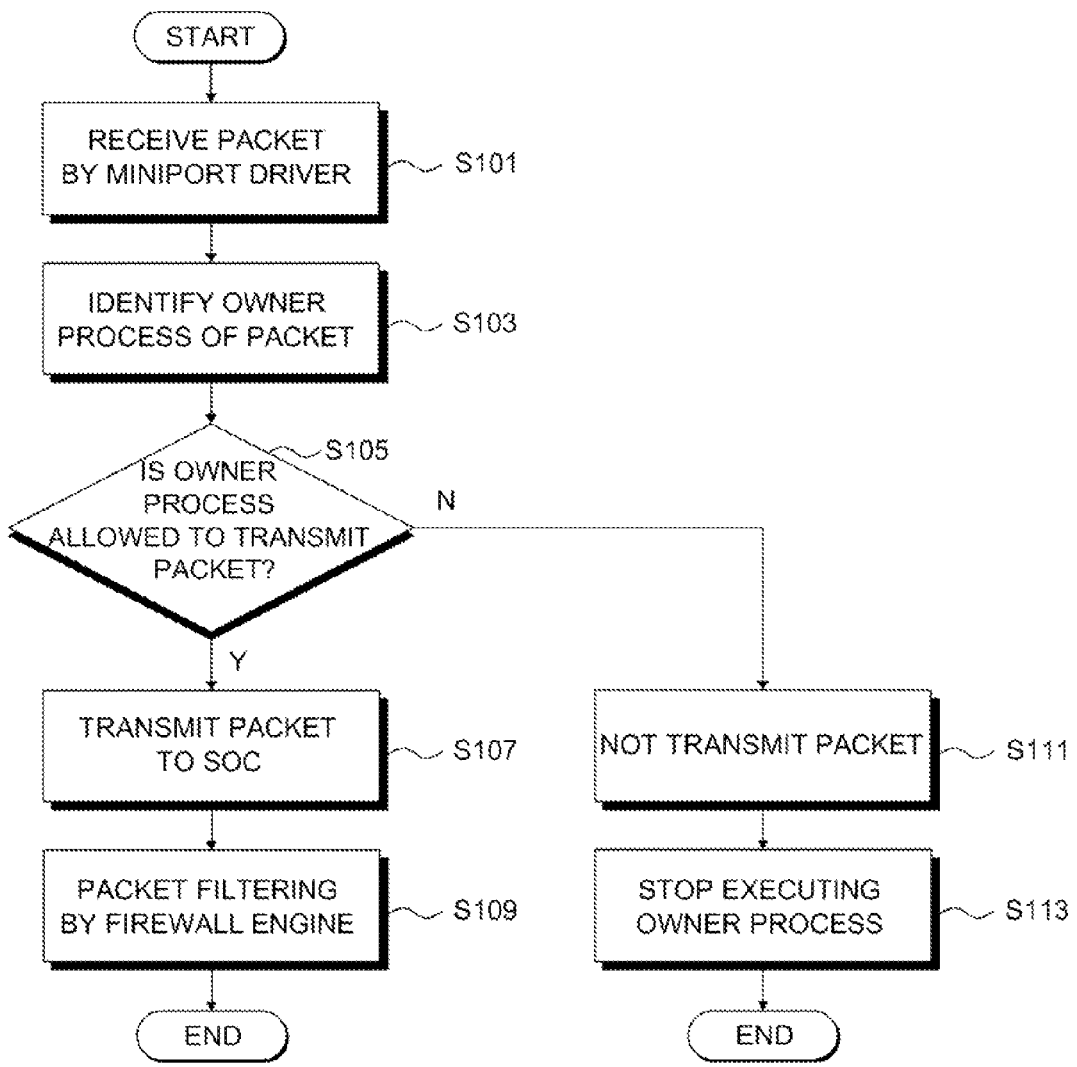
FIGS. 3A and 3B are flowcharts to explain a packet filtering method of the device 2 according to an exemplary embodiment.
Figure 3B:
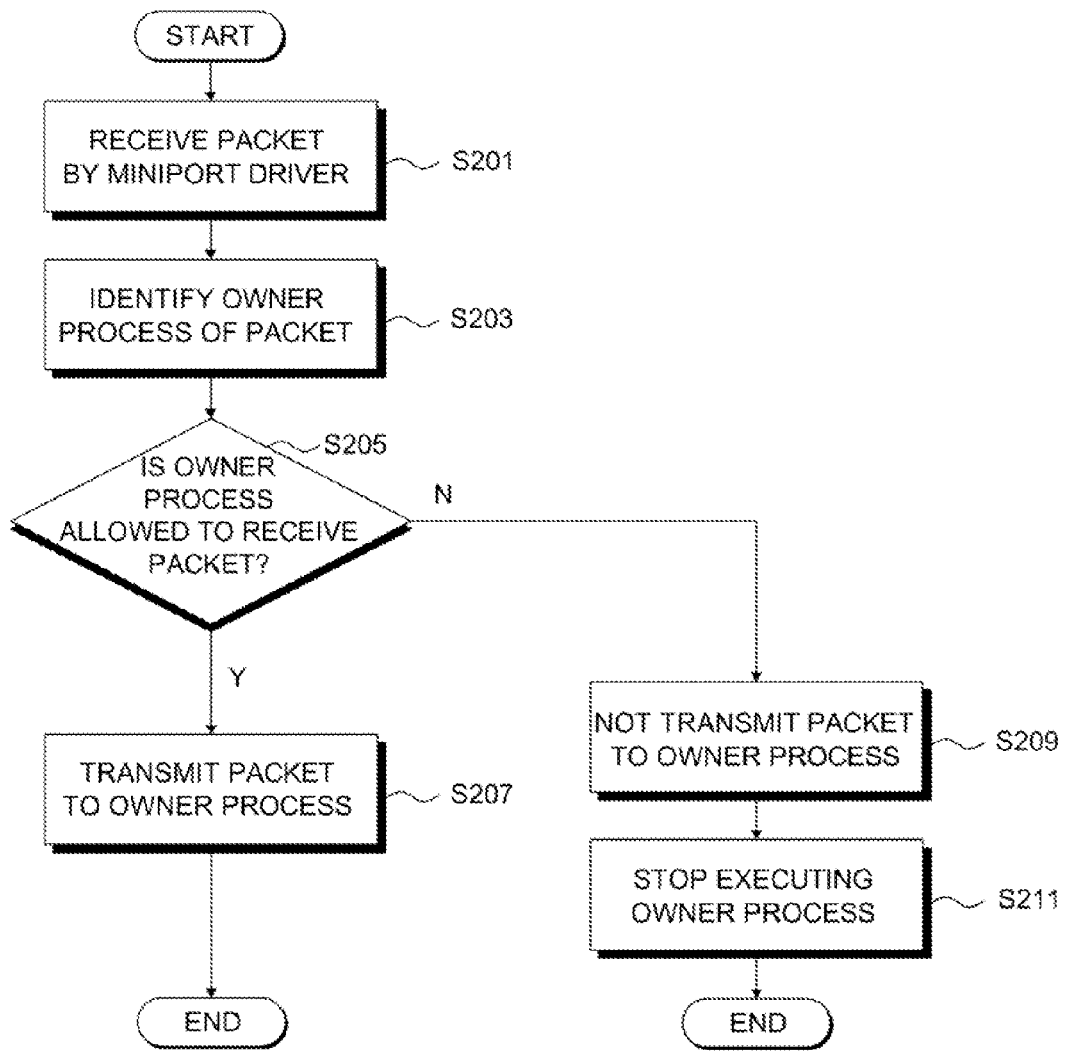

FIGS. 3A and 3B are flowcharts to explain a packet filtering method according to an exemplary embodiment. Specifically, FIG. 3A is a flowchart illustrating a packet filtering method if a packet is transmitted to an external device, and FIG. 3B is a flowchart illustrating a packet filtering method if a packet is received from an external device.

Referring to FIG. 3A, a packet is generated by the application 203 and is received by the miniport driver 217 prior to being transmitted to the outside of the device 200 in operation S101.

The miniport driver 217 identifies an owner process of this packet in operation S103. According to an exemplary embodiment, the owner process may be identified by a process ID included in the packet.

It is determined whether the owner process is allowed to transmit the packet to the outside in operation S105. In this determining operation, a rule DB for each process may be used. That is, the device 200 may include the rule DB 219 that defines a packet as being allowed or blocked according to a process, and it is determined whether the owner process is allowed to transmit the packet or not according to the rule for each process stored in the rule DB 219.

If it is determined that the owner process is allowed to transmit the packet in operation S105, the miniport driver 217 transmits the packet to the SOC in operation S107.

If the SOC receives the packet from the device 200, the SOC performs packet filtering in operation S109. For example, the firewall engine 229 performs packet filtering and allows or blocks the packet according to a result of the packet filtering. At this time, the firewall engine 229 may perform filtering by applying a pre-defined rule stored in the rule DB 224.

On the other hand, if it is determined that the owner process is not allowed to transmit the packet in operation S105, the miniport driver 217 does not transmit the packet to the SOC in operation S111. That is, according to an exemplary embodiment, the miniport driver 217 may discard the packet. In addition, the miniport driver 217 may stop executing the owner process in operation S113.

Packet filtering may be performed as shown in FIG. 3B if the device 200 receives a packet from an external device.

Referring to FIG. 3B, the miniport driver 217 of the device 200 receives a packet form an external device in operation S201. Although the packet is transmitted to the miniport driver 217 through the SOC in the embodiment of FIG. 2, the packet may not pass through the SOC according to an exemplary embodiment. If the packet passes through the SOC, the firewall engine 229 of the SOC performs packet filtering and the packet that is allowed to pass by the packet filtering is transmitted to the miniport driver 217. However, according to an exemplary embodiment, the packet may be transmitted to the miniport driver 217 without being filtered by the firewall engine 229.

The miniport driver 217 identifies an owner process of the packet in operation S203. According to an exemplary embodiment, the owner process may be identified by a process ID included in the packet.

It is determined whether the owner process is allowed to receive the packet in operation S205. In this determining operation, the rule DB for each process may be used. That is, if the device 200 includes the rule DB 219, it is determined whether the owner process is allowed to receive the packet or not according to the rule for each process stored in the rule DB 219.

If it is determined that the owner process is allowed to receive the packet in operation S205, the miniport driver 217 transmits the packet to the owner process in operation S207.

However, if it is determined that the owner process is not allowed to receive the packet in operation S205, the miniport driver 217 does not transmit the packet to the owner process in operation S209. According to an exemplary embodiment, the miniport driver 217 may discard the packet. In addition, the miniport driver 217 may stop executing the owner process in operation S211.

Figure 4:
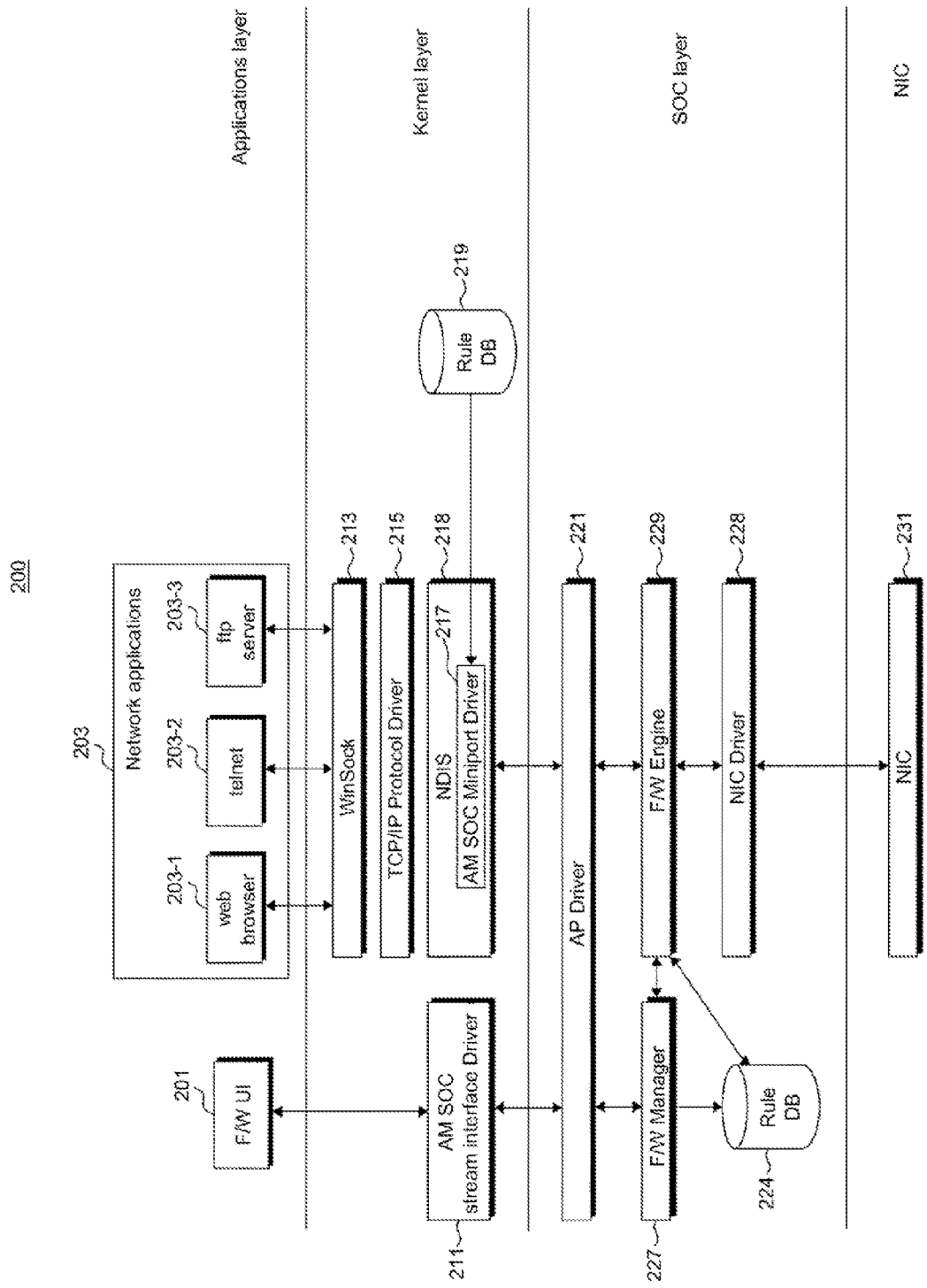
FIG. 4 is a view to explain a device on which a SOC is mounted according to another exemplary embodiment.

FIG. 4 is a view to explain a device on which a SOC is mounted according to another exemplary embodiment.

Comparing the device of FIG. 2, the device 200 according to the exemplary embodiment of FIG. 4 further includes a firewall user interface (UI) application 201 and an anti-malware (AM) SOC stream interface driver 211, and the SOC further includes a firewall manager 227. The other elements and their functions are the same as those of FIG. 2 or similar to those of FIG. 2.

The firewall UI application 201 provides a UI related to a firewall operation. For example, the firewall UI application 201 may provide a firewall operation job, a firewall stopping job, a rule adding job, a rule changing job, a specific rule removing job, an entire rule removing job, a rule state displaying job, a job of outputting a packet log applied to each rule, and a job of changing a basic rule setting.

The firewall UI application 201 may receive a rule for packet data filtering from the user, and may display a result of packet data filtering by the firewall engine 229 for the user. The firewall UI application 201 may perform updating with respect to the rule DB 224.

According to an exemplary embodiment, the firewall UI application 201 may display a result of packet filtering for each process by the miniport driver 217 for the user, and may update the rule DB 219 by receiving a rule for each process from the user.

The AM SOC stream interface driver 211 (hereinafter, referred to as a 'stream interface driver') may receive data from the firewall UI application 201 and transmit the data to the AP driver 221 of the SOC, and may receive data from the AP driver 221 and transmit the data to the firewall UI application 201.

The firewall manager 227 processes a user command input through the firewall UI application 201. For example, the firewall manager 227 may add a rule to the rule DB 224 or change the rule DB 224 according to a user command, and may read out a state of the rule DB 224 and transmit the state to the firewall UI application 201, thereby displaying the current state for the user.

Since the other elements than the firewall UI application 201, the stream interface driver 211, and the firewall manager 227 or their functions are the same as those of FIG. 2 or similar to those of FIG. 2, a detailed description is omitted.

In the configuration of FIG. 4, the user may change a rule setting of the rule DB 219 and/or the rule DB 224 through the firewall UI application 201 as will be described with reference to FIGS. 5 to 8.

FIG. 5 is a view to explain a rule setting screen provided by a firewall user interface according to an exemplary embodiment.

According to an exemplary embodiment, the firewall UI application 201 of the device 200 may provide a rule setting screen 500 in order for the user to set the rule DB 219 and/or the rule DB 224.

The device 200 transmits the rule input by the user through the rule setting screen 50 to the SOC, and the SOC may reflect the rule transmitted from the device 200 into the rule DB stored in the storage unit of the SOC.

Referring to FIG. 5, the rule setting screen 500 includes three sub-windows, that is, a basic setting window 510, a basic rule setting window 520, and a setting for each process window 530. The user may select one of the three sub-windows on the rule setting screen 500 to set a rule. Among these, FIG. 5 illustrates the basic setting window 510 as selected one.

The basic setting window 510 is displayed if the user wishes to allow or block a site corresponding to a certain specific IP address or an IP address of a specific network band.

In the exemplary embodiment of FIG. 5, the basic setting window 510 includes an input box 512 to provide a function of a configuration helper 511 and includes input boxes to fill various fields such as a rule name, an IP, a protocol, and a port under the configuration helper 511.

The configuration helper 511 helps a user who knows nothing of the network. According to an exemplary embodiment, the configuration helper 511 provides a list of network applications, and, if at least one network application is selected from among the network applications included in this list by the user, the configuration helper 511 may automatically display at least one of an IP, a protocol, and a port necessary for executing the selected network application on an input box of the corresponding field.

Figure 6:
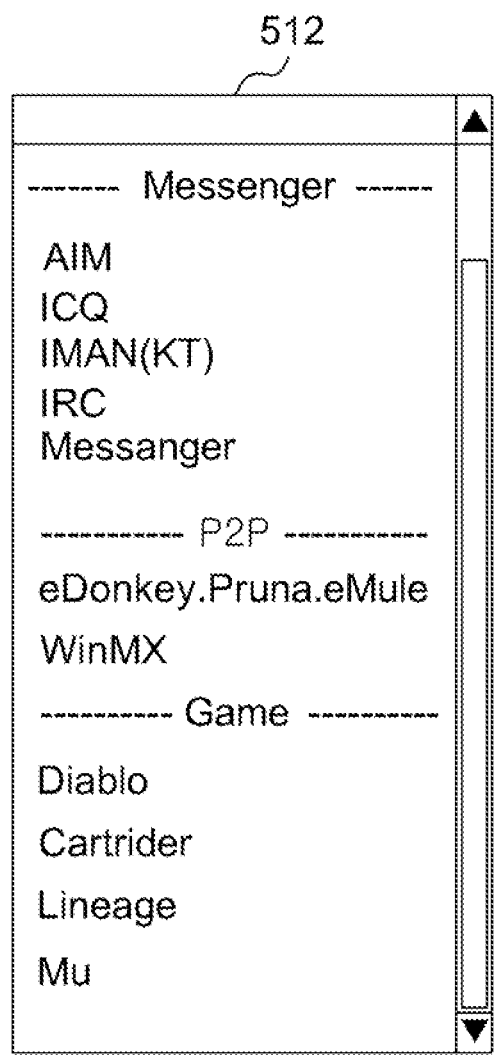
FIG. 6 is a view to explain a function of a configuration helper according to an exemplary embodiment.

For example, if a button of the input box 512 of the configuration helper 511 is selected by the user, a menu is displayed as shown in FIG. 6. If the user selects one of the displayed network applications, the fields such as the rule name, the IP, the protocol, and the port under the configuration helper 511 in FIG. 5 are automatically filled.

Although the list of FIG. 6 includes a messenger, a P2P, game, a protocol such as ftp, http, telnet, ssh, and printer may be included in the list to be selected according to an exemplary embodiment.

The configuration helper 511 is provided since general users know nothing of a specific protocol or a port of a specific service. Also, even if a user well knows a network, the user may not know that ports 6891~6900 and ports 41800~41899 should be allowed in order to transmit/receive a file through an MSN messenger until the user finds a relevant document. Therefore, by providing the configuration helper 511 for the general users, the user can easily perform a firewall setting job with respect to a service as he/she wishes.

Referring back to FIG. 5, the various fields under the configuration helper 511 will be explained:

Rule Name: Field to input a name of a rule.

Internet Protocol: Field to set an IP to which a rule is applied. In an exemplary embodiment, the IP field may be set in the following type:

| IP field | Meaning |
|---|---|
| 192.168.0.1 | Designating a specific network band |
| 192.168.0.* | Designating a specific network band |
| 192.168.*.* | Designating a specific network band |
| 192.*.*.* | Designating a specific network band |
| *.*.*.* | Meaning all IPs |
| * | Meaning all IPs |
| Blank | Meaning all IPs |
| 192.168.0.0/255.255.255.0 | Designating a specific network band |
| 192.168.0.10/255.255.255.224 | Designating a specific network band (subnet is used) |
| 192.168.0.20/24 | Designating a specific network band |
| 192.168.0.30/27 | Designating a specific network band (subnet is used) |
| FDEC:BA98:0074:3210:000F:BBFF:0000:2345 | Meaning IPv6 IP |
| FDEC:BA98:74:3210:F:BBFF:0:2345 | Meaning IPv6 IP |
| FDEC:BA98:74:3210:F:BBFF:0:FFFF/26 | Meaning a IPv6 specific network band |

In the input example of table 1, the mark '*' may be used as in '192.168.*.*'. The mark '192.168.*.*' is the same as the mark '192.168.0.0/255.255.0.0' or '192.168.0.0/16' in that it means a specific network band. However, general users may understand '192.168.*.*' more easily than '192.168.0.0/255.255.0.0' or '192.168.0.0/16', and thus '192.168.*.*' is allowed in this exemplary embodiment.

However, if a network band is designated by the mark '192.168.*.*', a sub-netmask cannot be designated. Therefore, the marks '192.168.0.0/255.255.0.0' or '192.168.0.0/16' may be used in parallel. Also, in the input example of table 1, the netmask field does not exist and instead it is incorporated into the IP field. The user may know an IP and a port, even if he/she knows nothing of the network. However, it is highly likely that the user who knows nothing of the network does not know the meaning of the netmask.

Protocol: Field to set a protocol to which a rule is applied. In an exemplary embodiment, if a protocol button is pressed, a menu list such as 'ALL', 'TCP', 'UDP', and 'ICMP' may be displayed. Besides the basic protocols, other protocols may be supported.

Port: Field to set a port to which a rule is applied. The user may input directly or may select by pressing a menu button. If the menu button is pressed, a protocol character string such as ftp, http, telnet, ssh is displayed. If one of these is selected, a minimum port number and a maximum port number may automatically enter or may be input by the user.

Direction: Field to designate a direction of a packet to which a rule is applied. In an exemplary embodiment, if a button is pressed, a menu list such as 'ALL', 'In→Out', 'Out→In' may be displayed. 'In→Out' means that a rule is applied to only a packet that is transmitted to the outside of the device 200, 'Out→In' means that a rule is applied to only a packet that is received by the device 200, and 'ALL' means that a rule is applied to all of the packets transmitted and received.

Local Device: Field to set a network interface IP to which a rule is applied. For example, if the device 200 includes two NICs and a rule is to be applied to a packet input through a specific NIC, an IP of the specific NIC is entered in this field. If a button of this field is pressed, 'ALL' or an IP list of a local device is displayed to be selected.

MAC Address: Field to set a MAC address to which a rule is applied.

Action: Field to set what action is to be taken if a packet matched with a rule is input. The action may include 'Nothing', 'Allow', 'Block', and 'Logging'. The 'Logging' is a function of leaving a record of a log regarding a packet to which a rule is applied.

Figure 7:
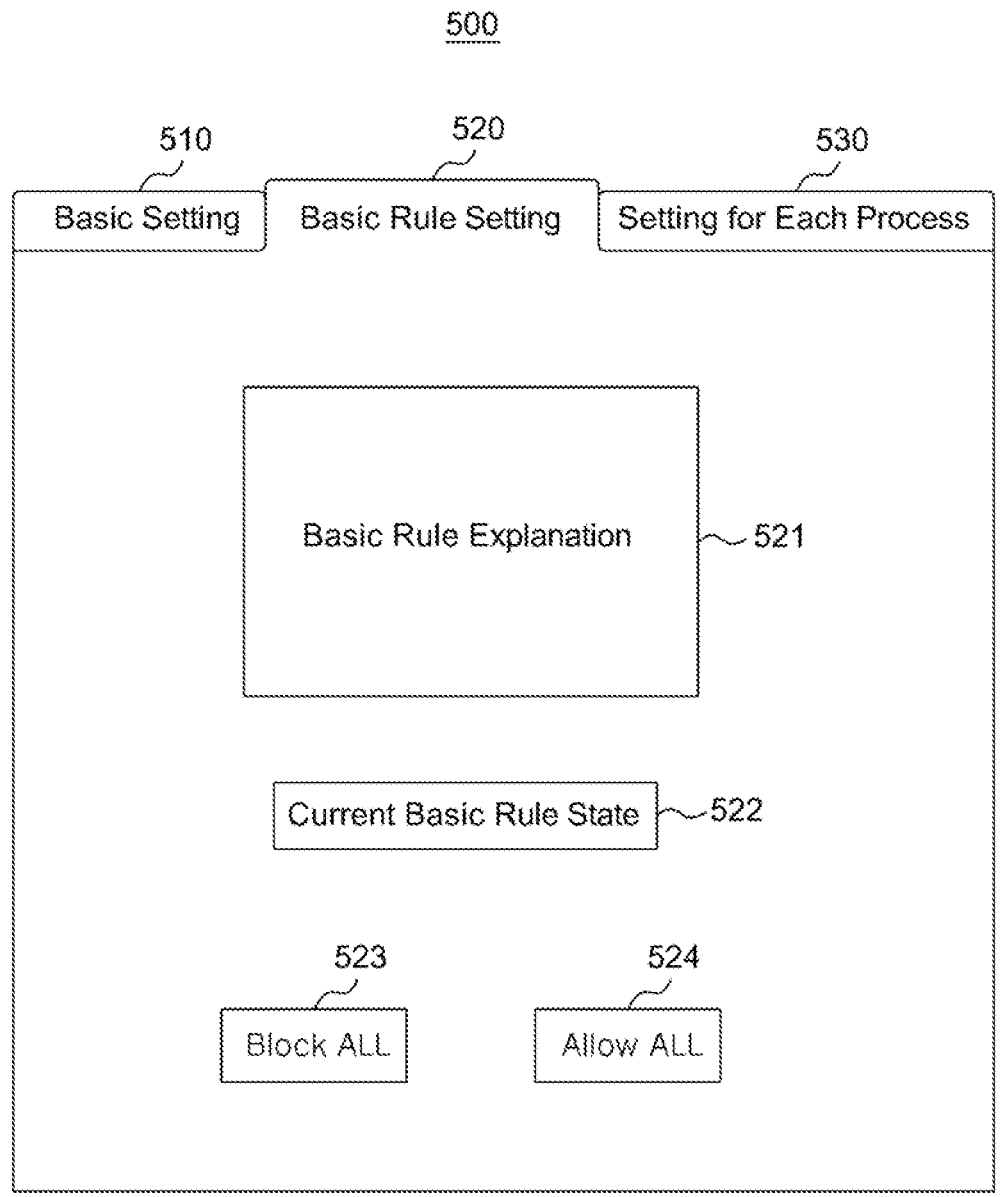
FIG. 7 is a view to explain a rule setting screen to set a basic rule according to an exemplary embodiment.

Referring to FIG. 7, a method of setting a basic rule according to an exemplary embodiment will be explained. FIG. 7 is a view to explain the rule setting screen 500 to set a basic rule according to an exemplary embodiment. FIG. 7 illustrates the basic rule setting window 520 as selected one.

The basic rule is a rule to be applied if a packet that does not conform to the rule set by the user as shown in FIG. 5 is input. Referring to FIG. 7, the basic rule setting window 520 may include a box 521 that explains a basic rule and a box 522 that displays a current basic rule state, and may include an all block button 523 and an all allow button 524.

The box 521 explaining the basic rule is an explanation box to explain a meaning of a basic rule setting to the user, and the box 522 displaying the current basic rule state displays a state of a currently set basic rule.

In an exemplary embodiment, the basic rule, as a basic default value, may be set to allow packets that are transmitted to the outside (outgoing packets) and block packets that are input to the device (incoming packets). The all block button 523 and the all allow button 524 are to set such a basic rule setting as 'blocking' or 'allowing' all of the outgoing and incoming packets, respectively.

Rule setting information input by the user through the basic setting window 510 or the basic rule setting window 520 of the rule setting screen 500 is transmitted to the firewall manager 227 of the SOC through the stream interface driver 211, and is reflected into the rule DB 224 by the firewall manager 227, so that the rule DB is updated.

Figure 8:
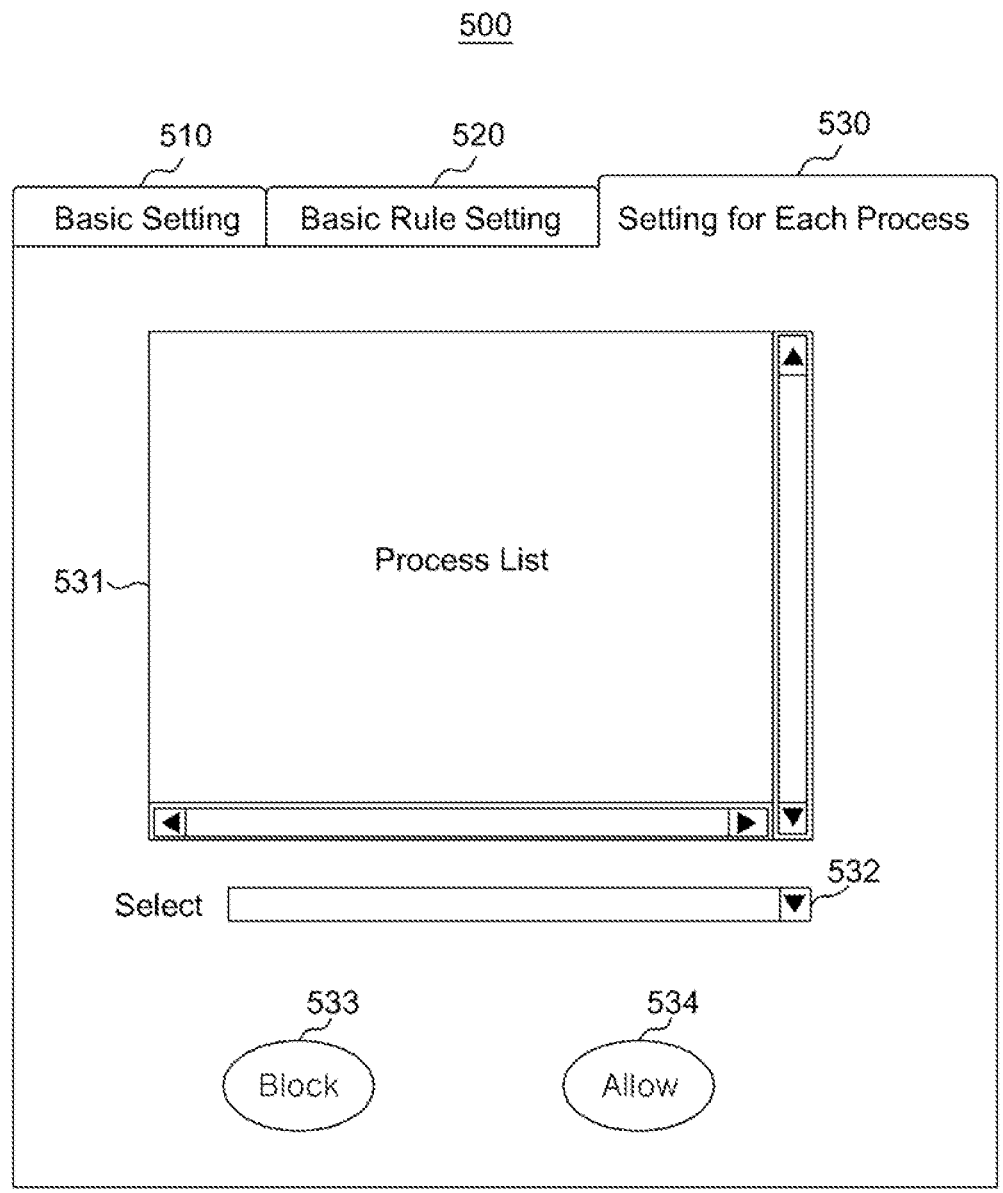
FIG. 8 is a view to explain a rule setting screen to set a rule according to a process according to an exemplary embodiment.

FIG. 8 is a view to explain the rule setting screen to set a rule according to a process according to an exemplary embodiment, in which the setting window 530 is selected.

The setting for each process window 530 is an area to input a rule for each process that defines a packet as being allowed or blocked according to a process of an application, and may include a process list 531, a selection box 532, a block button 533, and an allow button 534.

The user may set a firewall regarding a process of a certain specific application as 'allow' through the setting window 530, thereby allowing all packets generated by the process to pass, and may set a firewall regarding a process of a certain specific application as 'block', thereby blocking all packets generated by the process.

According to an exemplary embodiment, rule setting information input by the user through the setting window 530 of the setting screen 500 is reflected into the rule DB 219 by the stream interface driver 211, so that the rule DB for each process is updated. However, alternatively, the rule DB 219 may be updated by the firewall UI application 201 or other element.

Figure 9:
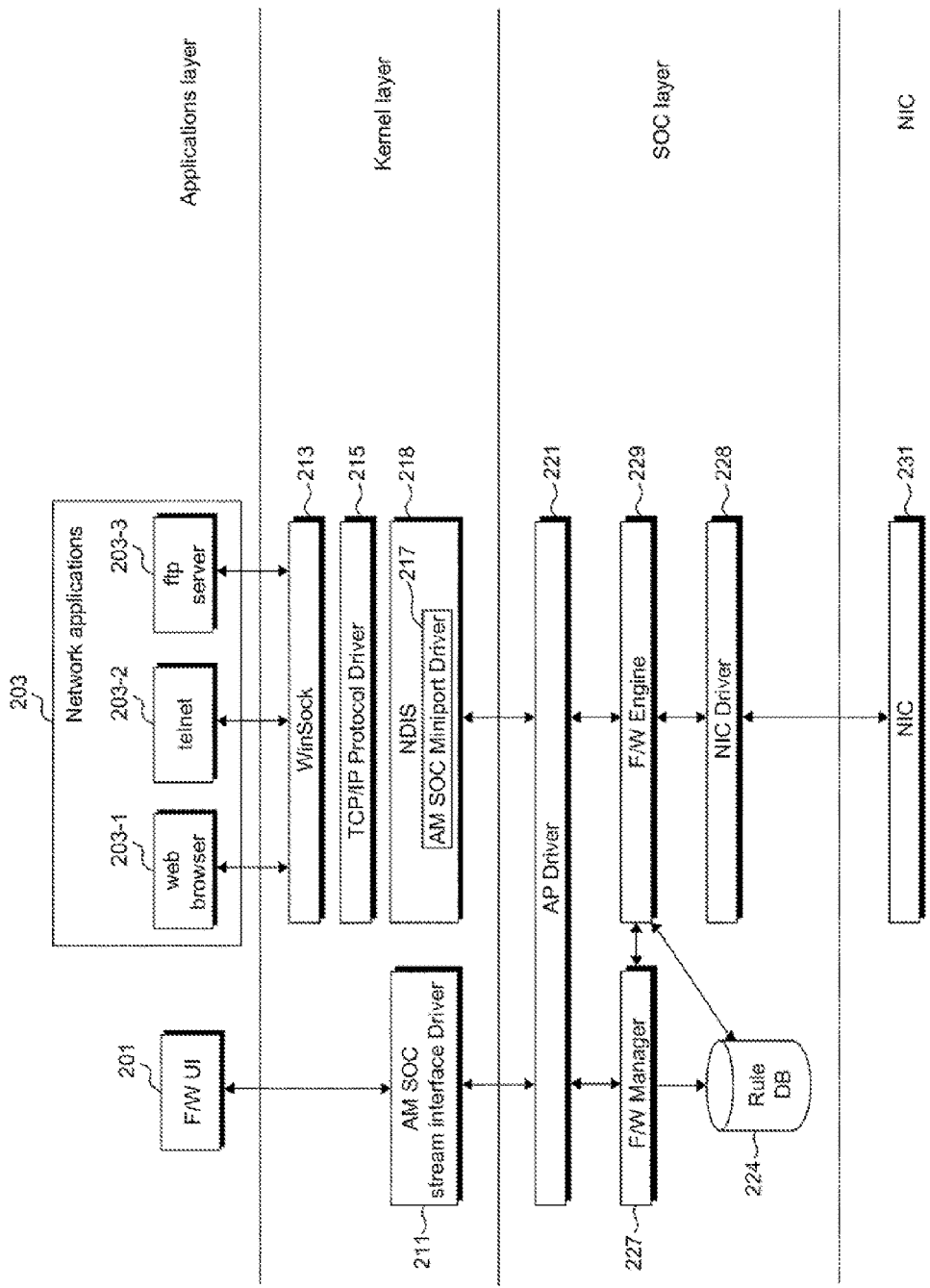
FIG. 9 is a view to explain a device on which a SOC is mounted according to still another exemplary embodiment.

FIG. 9 is a view to explain a device on which a SOC is mounted according to still another exemplary embodiment.

Comparing the device of FIG. 4, the rule DB 219 of the kernel layer in the exemplary embodiment of FIG. 9 is optional. Accordingly, it is assumed that the rule DB 219 is not provided in FIG. 9. Functions or roles of the other elements are the same as those of FIG. 4 or similar to those of FIG. 4 and thus a detailed description is omitted.

In the exemplary embodiment of FIG. 9, the miniport driver 217 does not perform receiving the rule DB for each process from the rule DB and comparing the packet and the rule DB. Instead, if the device 200 transmits a packet to an external device for example, the miniport driver 217 receives the packet, identifies an ID of an owner process of the packet, and transmits the process ID to the SOC along with the packet, and the SOC applies the rule DB for each process to the packet.

That is, in the exemplary embodiment of FIG. 9, the rule DB 224 further includes a rule DB for each process, and the rule DB for each process includes a rule DB that defines a packet as being allowed or blocked according to a process. Accordingly, if a packet is transmitted to the firewall engine 229, the firewall engine 229 determines whether the owner process of the packet is allowed to transmit and receive the packet or not according to the rule for each process stored in the rule DB 224, and allows or blocks the packet according to a result of determining and also may request to stop executing the owner process.

Such a packet filtering operation will be explained with reference to FIG. 10.

Figure 10:
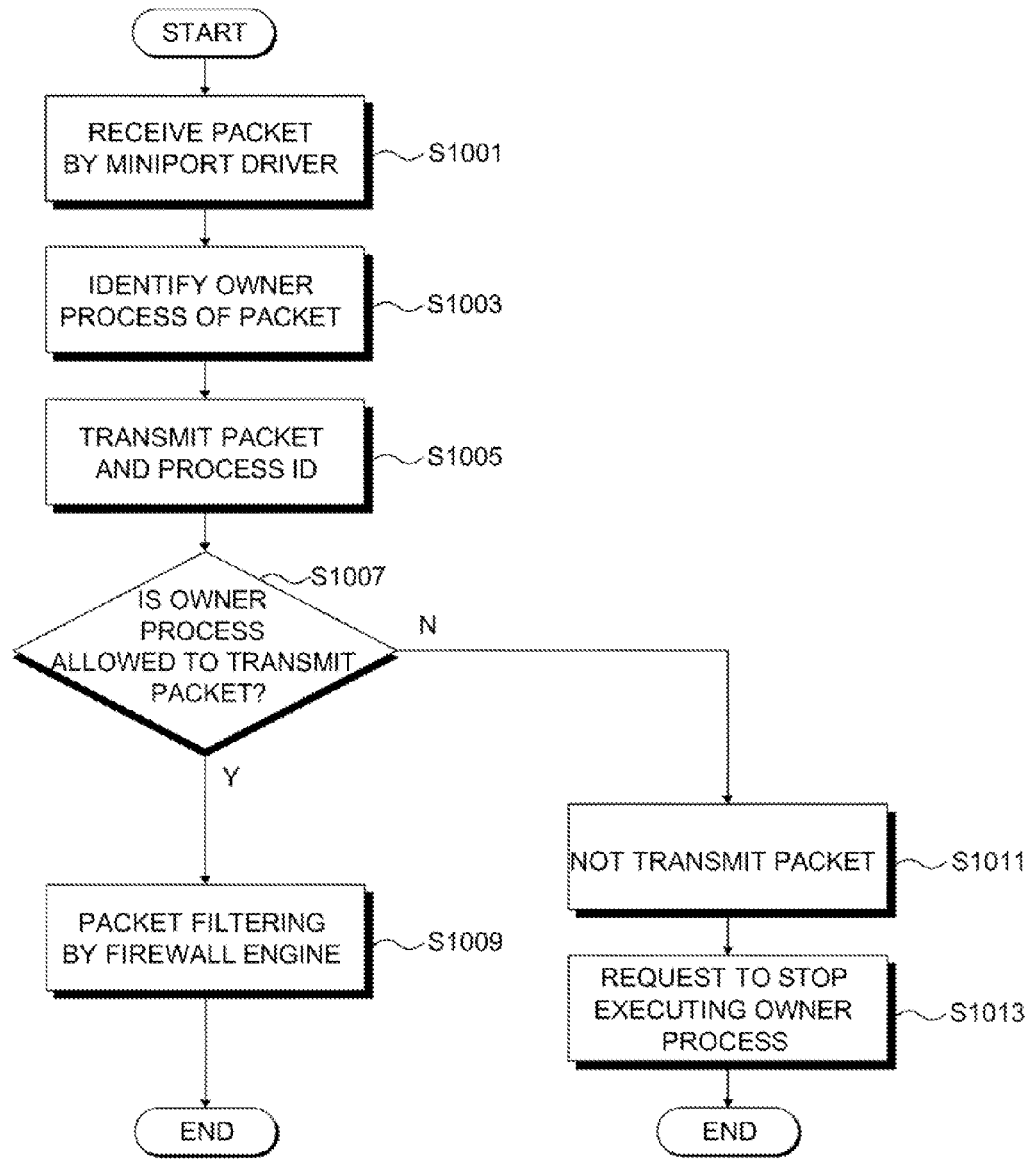
FIG. 10 is a flowchart illustrating a packet filtering method of FIG. 9 according to an exemplary embodiment.

FIG. 10 is a flowchart to explain a packet filtering method of the device of FIG. 9 if the device 200 transmits a packet to an external device according to an exemplary embodiment.

Referring to FIG. 10, a packet is generated by a certain application 203 and is transmitted to the miniport driver 217 prior to being transmitted to the outside of the device 200 in operation S1001.

The miniport driver 217 identifies an owner process of the packet in operation S1003. According to an exemplary embodiment, the owner process may be identified by a process ID included in the packet.

Information identifying the owner process using the packet is generated and transmitted to the SOC along with the packet in operation S1005. At this time, the identification information may be a process ID for example.

The packet and the identification information (for example, a process ID) are transmitted to the firewall engine 229 of the SOC, and the firewall engine 229 determines whether the owner process is allowed to transmit the packet to the external device in operation S1007. In this determining operation, the rule DB for each process may be used. That is, the rule DB 224 may include a rule that defines a packet as being allowed or blocked according to a process, and it is determined whether the owner process is allowed to transmit the packet or not according to the rule for each process.

If it is determined that the owner process is allowed to transmit the packet in operation S1007, the firewall engine 229 performs packet filtering in operation S1009. That is, a filtering job, such as determining whether to allow or block the packet according to the packet filtering rule stored in the rule DB 224, may be performed, and the packet is allowed or blocked according to a result of the determining.

Alternatively, the packet filtering operation (operation S1009) may be performed before the determining operation (operation S1007). That is, the determining operation (S1007) may be performed with respect to only the packet that passes through the packet filtering operation.

If the owner process is not allowed to transmit the packet in operation S1007, the firewall engine 229 does not transmit the packet to the NIC driver 228 in operation S1011. According to an exemplary embodiment, the firewall engine 229 may discard the packet. In addition, the firewall engine 229 may transmit a signal to stop executing the owner process to the kernel layer in operation S1013.

Figure 11:
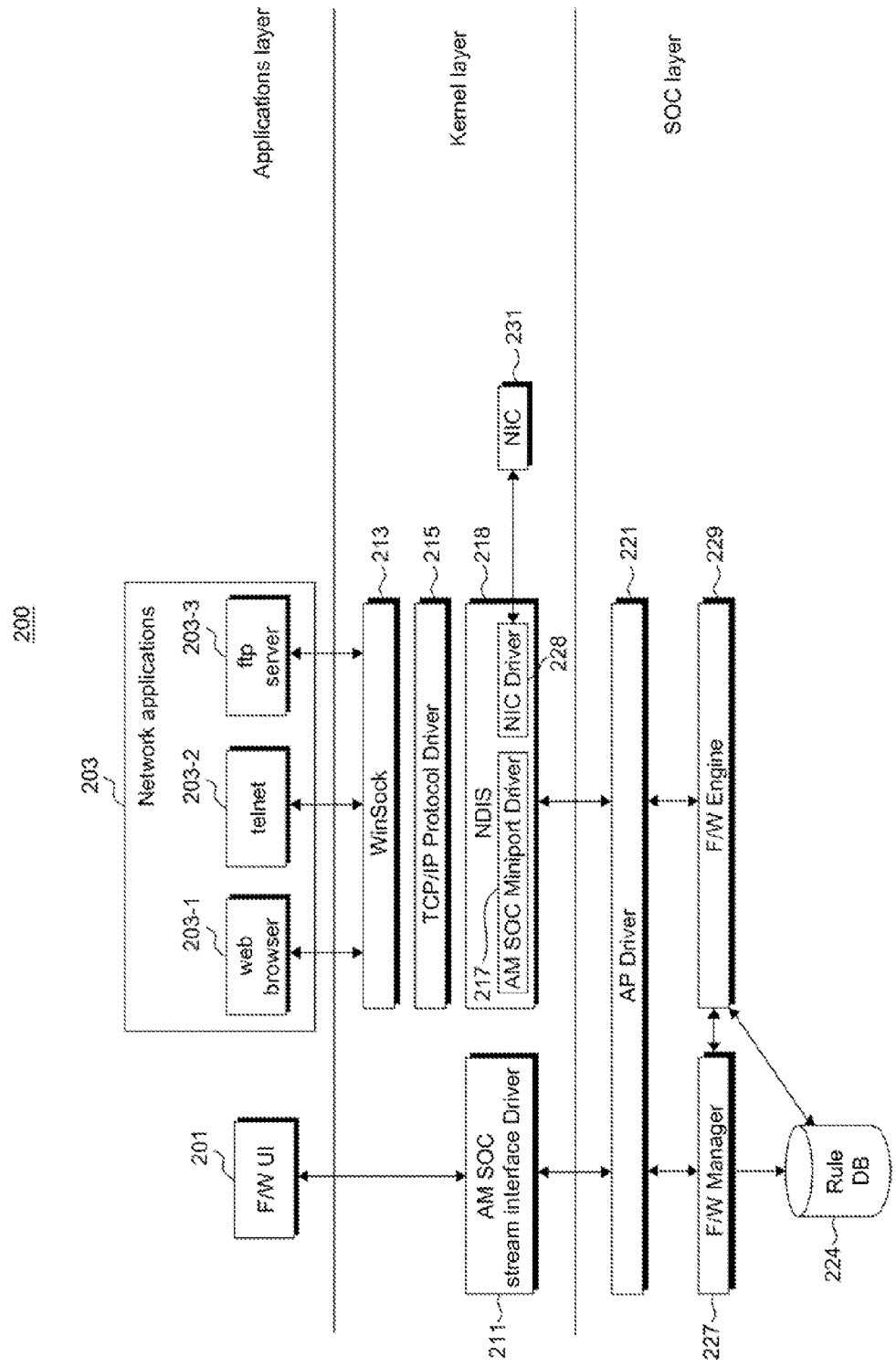
FIG. 11 is a view to explain a device on which a SOC is mounted according to still another exemplary embodiment.

FIG. 11 is a view to explain a device on which a SOC is mounted according to still another exemplary embodiment.

Comparing the device of FIG. 9, locations of the NIC driver 228 and the NIC 231 provided in order for the device 200 to communicate with an external device are different. Referring to FIG. 11, the NIC 231 is located on a body of the device 200 rather than the SOC and the NIC driver 228 is also located on the NDIS 218 of the kernel layer. Functions or roles of the other elements are the same as those of FIG. 9 or similar to those of FIG. 9 and thus a detailed description is omitted.

According to the exemplary embodiment of FIG. 11, a packet that is transmitted to an external device from the device 200 or a packet that is received by the device 200 from an external device may be transmitted to the miniport driver 217. Accordingly, the miniport driver 217 identifies an ID of an owner process of each of the packets transmitted or received and transmits the process ID to the SOC along with the packet, and the SOC applies the rule DB for each process to the packet.

Figure 12:
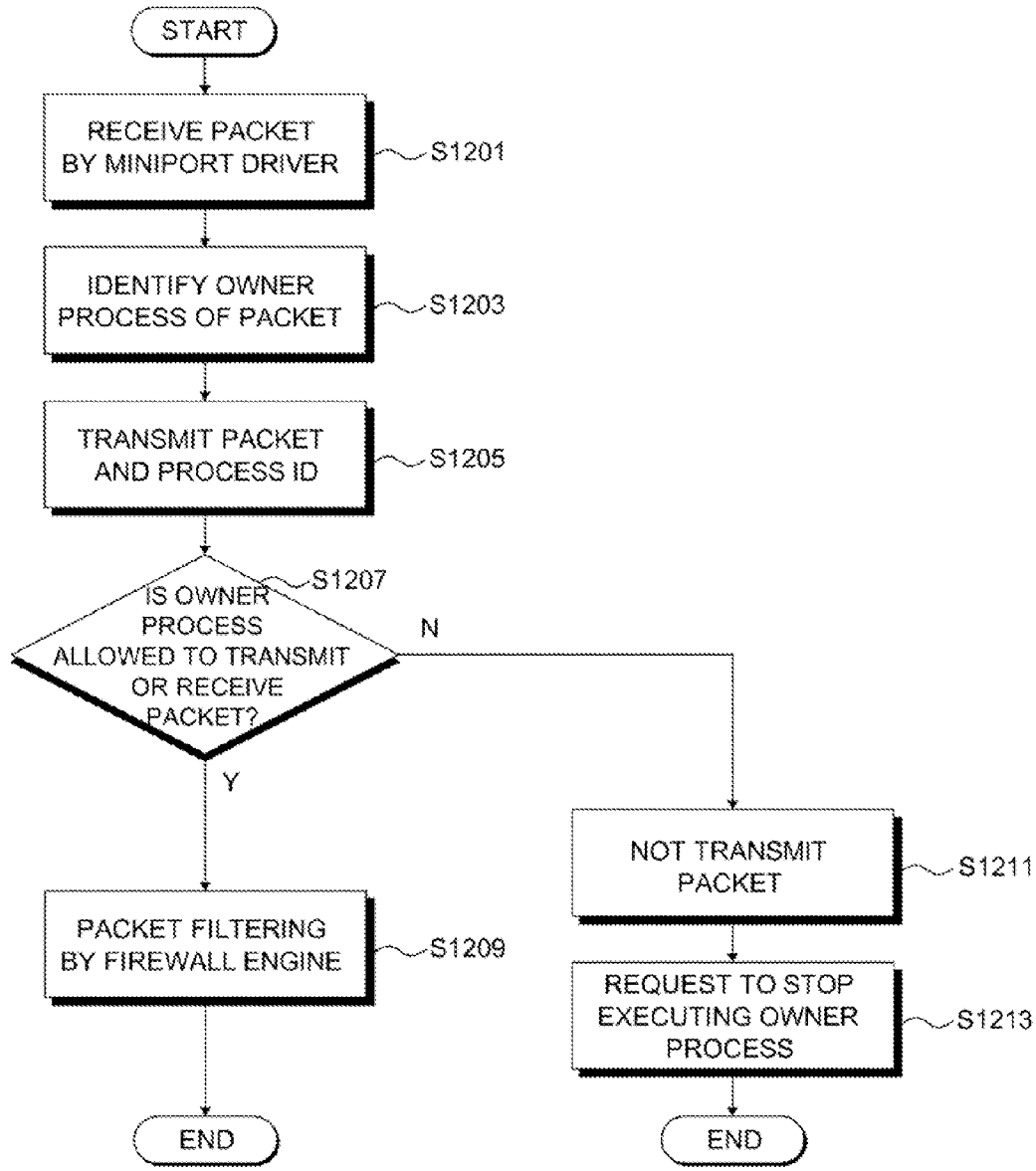
FIG. 12 is a flowchart illustrating a packet filtering method of the device of FIG. 11 according to an exemplary embodiment.

Such a packet filtering operation will be explained with reference to FIG. 12. FIG. 12 is a flowchart to explain a packet filtering method of the device of FIG. 11 according to an exemplary embodiment.

Referring to FIG. 12, a packet transmitted or received is transmitted to the miniport driver 217 in operation S1201, and the miniport driver 217 identifies an owner process of the packet in operation S1203. According to an exemplary embodiment, the owner process may be identified by a process ID included in the packet.

Information identifying the owner process using the packet is generated and transmitted to the SOC along with the packet. At this time, the identification information may be a process ID for example.

The packet and the identification information (for example, a process ID) is transmitted to the firewall engine 229 of the SOC, and the firewall engine 229 determines whether the owner process is allowed to transmit or receive the packet or not using the rule DB for each process in operation S1207.

That is, if the packet is to be transmitted to an external device, it is determined whether the owner process of the packet is allowed to transmit the packet or not, and, if the packet is received from an external device, it is determined whether the owner process of the packet is allowed to receive the packet or not.

If it is determined that the owner process is allowed to transmit or receive the packet in operation S1207, the firewall engine 229 performs packet filtering in operation S1209. That is, a packet filtering job may be performed according to the packet filtering rule stored in the rule DB 224, and the packet is allowed or blocked according to a result of the packet filtering. Alternatively, the packet filtering operation (operation S1209) may be performed before the determining operation (operation S1207).

If it is determined that the owner process of the packet to be transmitted to the external device is not allowed to transmit the packet in operation S1207, the firewall engine 229 does not transmit the packet to the NIC driver 228 in operation S1211. According to an exemplary embodiment, the firewall engine 229 may discard the packet. Additionally, the firewall engine 229 may transmit a signal to stop executing the owner process to the kernel layer in operation S1213.

If it is determined that the owner process of the packet received from the external device is not allowed to receive the packet in operation S1207, the firewall engine 229 does not transmit the packet to the application 203 in operation S1211. According to an exemplary embodiment, the firewall engine 229 may discard the packet. Additionally, the firewall engine 229 may transmit a signal to stop executing the owner process to the kernel layer in operation S1213.

Figure 13:
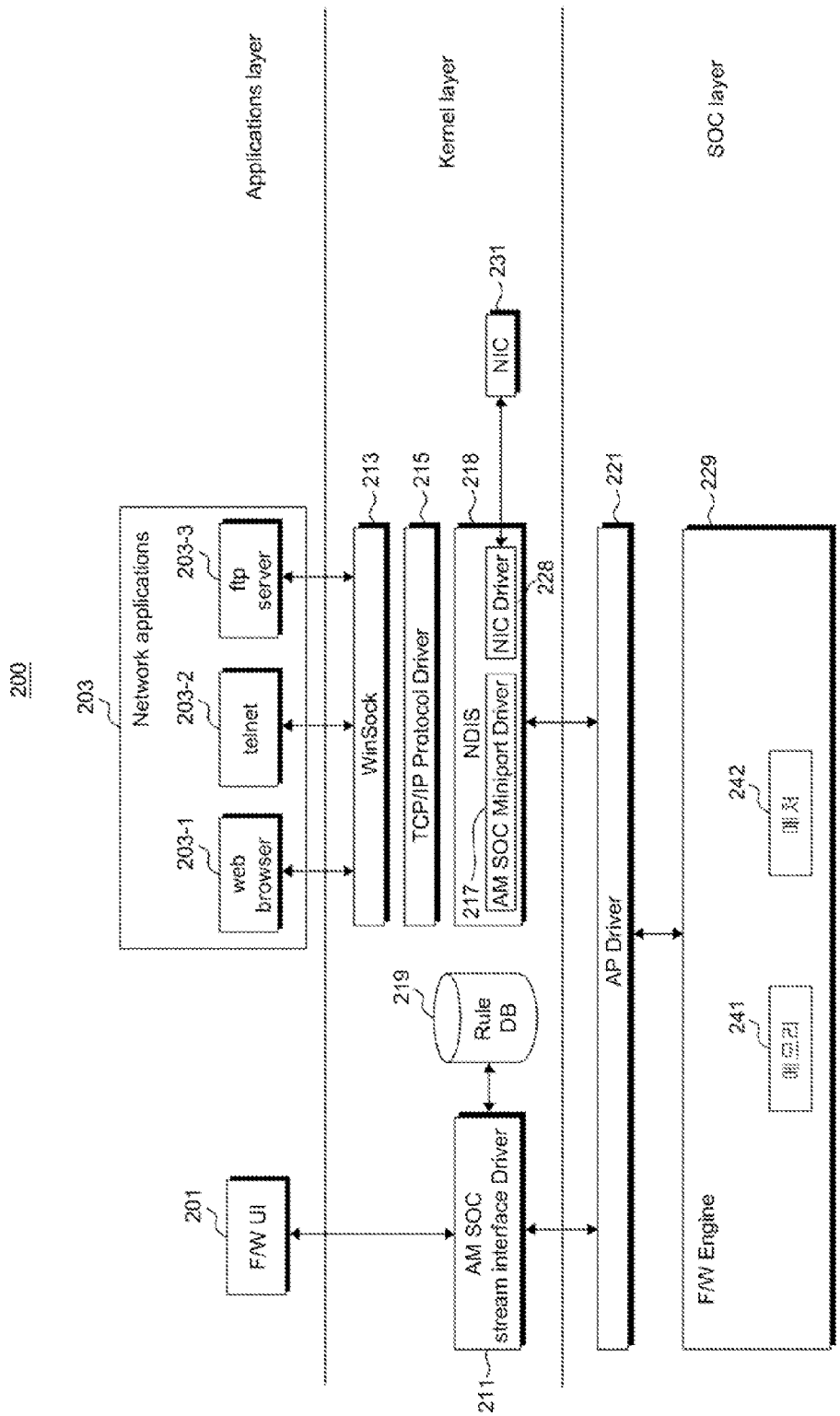
FIG. 13 is a view to explain a device on which a SOC is mounted according to still another exemplary embodiment.

FIG. 13 is a view to explain a device on which a SOC is mounted according to still another exemplary embodiment.

FIG. 13 is different from FIG. 11 in that the SOC includes only hardware elements. That is, the SOC of FIG. 13 includes the AP driver 221 and the firewall engine 229 to communicate with the kernel layer of the device 200. According to an exemplary embodiment, the firewall engine 229 may include a memory 241 and a matcher 242.

The memory 241 loads the rule DB stored in the storage device of the device 200 and temporarily stores the rule DB, and may be a volatile storage device. The matcher 242 may determine whether to allow or block a packet by comparing the packet and the packet filtering rule of the rule DB and/or the rule for each process. Functions or roles of the other elements are same as those of FIG. 11 or similar to those of FIG. 11 and THUS a detailed description thereof is omitted.

A packet filtering operation of the device of FIG. 13 is the same as that of FIG. 12 or similar to that of FIG. 12. However, prior to performing packet filtering by the firewall engine 229, the rule DB 219 stored in the storage device of the device 200 is loaded into the memory 241 of the SOC. After that, the miniport driver 217 identifies an ID of an owner process of each of packets transmitted or received and transmits the process ID to the SOC along with the packet, and the firewall engine 229 of the SOC applies the packet filtering rule including the rule for each process.

Although the packet is set to be allowed or blocked or execution of the process itself is stopped in the unit of 'process' of an application (program) in the above exemplary embodiments, the above operation may be performed in the unit of program other than a process. For example, with respect a blocked packet, an owner program of the packet may be identified and execution of the program may be stopped. That is, the above-described embodiments may be included in the present disclosure even if the 'process' is substituted with a 'program'.

The embodiments described above may be realized by a computer readable code on a computer readable recording medium. The computer readable recording medium includes all kinds of recording apparatuses that store data readable by a computer system. Examples of the computer readable recording medium are a read only memory (ROM), a random access memory (RAM), a CD-ROM, a magnetic tape, a floppy-disk, and an optical data storage device, and also may include a storage device realized in a format of a carrier wave (for example, transmission through the internet). The computer readable recording medium is distributed over a computer system connected through a network and may store and execute a code readable by a computer in a distributed manner.

According to one or more aspects of the exemplary embodiments, a firewall is set to allow or block packets according to a process of a network application, thereby allowing or blocking all of the packets generated by a process.

According to one or more aspects of the exemplary embodiments, a firewall setting job can be more easily performed with respect to a service desired by a user by providing the configuration helper when setting the rule for packet filtering.

While exemplary embodiments have been particularly shown and described above, it will be understood by those of ordinary skill in the art that various changes in form and details may be made therein without departing from the spirit and scope of the present invention as defined by the following claims.

What is claimed is:

1. A device comprising:
a chip comprising a firewall engine;
a driver;
a storage unit that stores a rule database (DB); and
at least one application which uses at least one process associated with at least one packet,
wherein the rule DB stores a rule for each process,
wherein an owner process uses the packet by transmitting the packet to an external device or receiving the packet from an external device,
wherein, if the packet is to be transmitted to a chip, the driver identifies the owner process of the packet, and transmits the packet to the chip only if the owner process is allowed to transmit the packet to an external device based on a rule for the owner process stored in the rule DB, and
wherein the chip filters the packet received from the driver by applying a rule for packet filtering,
wherein a rule for a process defines a packet as being allowed or blocked according to the process associated with the packet, and
wherein, if the packet is to be transmitted, the driver obtains an owner process identification (ID) included in the packet and determines whether a process having the owner process ID is allowed to transmit the packet to the external device by referring to the rule DB for each process, and transmits the packet to the chip only if the process is allowed to transmit the packet.

2. The device as claimed in claim 1, wherein, if the owner process of the packet to be transmitted is not allowed to transmit the packet to the external device, the driver does not transmit the packet to the chip.

3. The device as claimed in claim 2, wherein, if the owner process of the packet to be transmitted is not allowed to transmit the packet to the external device, the driver stops executing the owner process.

4. The device as claimed in claim 1, wherein the chip further comprises a network interface card, and the chip determines whether or not to transmit a packet received through the network interface card to the driver by applying the rule to the packet.

5. The device as claimed in claim 4, wherein the driver identifies an owner process of the packet received from the chip and transmits the packet to the owner process only if the owner process of the packet received from the chip is allowed to receive the packet from an external device.

6. The device as claimed in claim 1, further comprising a firewall user interface that provides a rule setting screen comprising an area for a user to input information identifying at least one from among an internet protocol (IP), a protocol, and a port,
    wherein the device converts the information from the user into a rule,
    wherein the firewall user interface transmits the rule to the chip, and
    wherein the chip performs packet filtering using the rule received from the firewall user interface.

7. The device as claimed in claim 6, wherein the rule setting screen further comprises a configuration helper,
    wherein the configuration helper provides a list of network applications, and, if at least one of the network applications is selected by the user, the configuration helper determines if at least one from among an IP, a protocol, and a port is necessary for executing the selected network application and inputs the necessary IP, protocol, or port into the area.

8. The device as claimed in claim 6, wherein the rule setting screen comprises an area to input a process and a rule, and
    if a process and a rule are inputted, the rule governs all packets generated by the process.

9. A packet filtering method, the packet filtering method comprising:
    storing a rule for each process in a rule database (DB),
    identifying, by a device, an owner process of a packet to be transmitted, and transmitting the packet to a system-on-chip (SOC) only if the owner process of the packet to be transmitted is allowed to transmit the packet to an external device based on a rule for the owner process stored in the rule DB; and
    filtering, by the SOC, the packet transmitted from the device by applying a rule for packet filtering,
    wherein a rule for a process defines a packet as being allowed or blocked according to a process associated with the packet, and
    wherein if the packet is to be transmitted, the device obtains an owner process identification (ID) included in the packet and determines whether a process having the owner process ID is allowed to transmit the packet to the external device by referring to the rule DB for each process, and transmits the packet to the SOC only if the process is allowed to transmit the packet.

10. The packet filtering method as claimed in claim 9, wherein, if the owner process of the packet to be transmitted is not allowed to transmit the packet to the external device, the device does not transmit the packet to the SOC.

11. The packet filtering method as claimed in claim 10, wherein, if the owner process of the packet to be transmitted is not allowed to transmit the packet to the external device, the device stops executing the owner process.

12. The packet filtering method as claimed in claim 9, wherein the SOC further comprises a network interface card, and the SOC performs packet filtering by applying the rule to a packet received through the network interface card.

13. The packet filtering method as claimed in claim 12, wherein the device identifies an owner process of the packet received from the SOC and transmits the packet to the owner process only if the owner process of the packet received from the SOC is allowed to receive the packet.

14. The packet filtering method as claimed in claim 9, further comprising:
    providing, by the device, a rule setting screen comprising an area to for a user to input information identifying at least one of an internet protocol (IP), a protocol, and a port;
    converting, by the device, the information into a rule; and
    transmitting, by the device, the rule to the SOC; and
    filtering, by the SOC, the packet using the rule transmitted from the device.

15. The packet filtering method as claimed in claim 14, wherein the rule setting screen further comprises a configuration helper,
    wherein the configuration helper provides a list of network applications, and, if at least one of the network applications is selected by the user, the configuration helper determines if at least one of an IP, a protocol, and a port is necessary for executing the selected network application and inputs the necessary IP, protocol, or port into the area.

16. The packet filtering method as claimed in claim 15, wherein the rule setting screen comprises an area to input a process and a rule, and
    if a process and a rule are inputted, the rule governs all packets generated by the first process.

17. A non-transitory computer readable storing medium that stores a program for enabling a computer to perform a method, the method comprising:
    storing a rule for each process in a rule database (DB),
    identifying an owner process of a packet to be transmitted to an external device; and
    only if the owner process of the packet to be transmitted is allowed to transmit the packet to the external device based on a rule for the owner process stored in the rule DB, transmitting the packet to a chip,
    wherein the chip is mounted on the computer and has a packet filtering function,
    wherein a rule for a process defines a packet as being allowed or blocked according to a process associated with the packet, and
    wherein if the packet is to be transmitted, obtaining an owner process identification (ID) included in the packet and determining whether a process having the owner process ID is allowed to transmit the packet to the external device by referring to the rule DB for each process, and transmitting the packet to the chip only if the process is allowed to transmit the packet.

18. A device comprising:
    a chip that comprises a firewall engine,
    a driver, and
    a storage unit that stores a rule database (DB),
    wherein the rule DB stores a rule for each process,
    wherein the driver obtains an owner process identification (ID) of a packet to be transmitted to an external device and transmits the packet and the owner process ID of the packet to the chip based on a rule for the owner process stored in the rule DB, and
    wherein the firewall engine of the chip filters the packet transmitted from the driver using a rule DB for packet filtering, wherein a rule for a process defines a packet as being allowed or blocked according to a process associated with the packet, and wherein if the packet is to be transmitted, the device determines whether a process having the owner process ID is allowed to transmit the packet to the external device by referring to the rule DB for each process, and transmits the packet to the chip only if the process is allowed to transmit the packet.

19. The device as claimed in claim 18, wherein the firewall engine of the chip determines whether a process having the owner process ID transmitted from the driver is allowed to transmit the packet to the external device by applying the rule DB for packet filtering.

20. The device as claimed in claim 18, further comprising a network interface card, wherein the driver obtains an owner process ID of a packet received through the network interface card and transmits the owner process ID and the packet to the chip.

21. A non-transitory computer readable storing medium that stores a program for enabling a computer to perform a method, the method comprising:

storing a rule for each process in a rule database (DB), identifying an owner process of a packet to be transmitted to an external device;

obtaining an owner process identification (ID) of the packet to be transmitted to the external device; and transmitting the packet and the owner process ID to a chip based on a rule for the owner process stored in the rule DB, wherein the chip is mounted on the computer and has a packet filtering function, wherein a rule for a process defines a packet as being allowed or blocked according to a process associated with the packet, and wherein if the packet is to be transmitted, determining whether a process having the owner process ID is allowed to transmit the packet to the external device by referring to the rule DB for each process, and transmitting the packet to the chip only if the process is allowed to transmit the packet.

22. The non-transitory computer readable storing medium as claimed in claim 21, wherein the method further comprises obtaining an owner process ID of a packet received through a network interface card and transmitting the owner process ID and the packet to the chip.

* * * * *